(12) United States Patent
McKeeth

(10) Patent No.: US 7,979,427 B2
(45) Date of Patent: Jul. 12, 2011

(54) METHOD AND SYSTEM FOR UPDATING A SEARCH ENGINE

(75) Inventor: Jim McKeeth, Nampa, ID (US)

(73) Assignee: Round Rock Research, LLC, Mount Kisco, NY (US)

( * ) Notice: Subject to any disclaimer, the term of this patent is extended or adjusted under 35 U.S.C. 154(b) by 0 days.

(21) Appl. No.: 12/616,668

(22) Filed: Nov. 11, 2009

(65) Prior Publication Data

US 2010/0057802 A1 Mar. 4, 2010

Related U.S. Application Data

(63) Continuation of application No. 10/882,087, filed on Jun. 29, 2004, now Pat. No. 7,627,568, which is a continuation of application No. 09/999,498, filed on Nov. 30, 2001, now Pat. No. 6,763,362.

(51) Int. Cl.
*G06G 7/00* (2006.01)
*G06F 17/30* (2006.01)

(52) U.S. Cl. ........................................ 707/723

(58) Field of Classification Search ........................ None
See application file for complete search history.

(56) References Cited

U.S. PATENT DOCUMENTS

| | | | |
|---|---|---|---|
| 5,855,020 A | 12/1998 | Kirsch | |
| 5,960,429 A | 9/1999 | Peercy et al. | |
| 6,085,226 A | 7/2000 | Horvitz | |
| 6,112,240 A | 8/2000 | Pogue et al. | |
| 6,263,364 B1 | 7/2001 | Najork et al. | |
| 6,278,992 B1 | 8/2001 | Curtis et al. | |
| 6,401,118 B1 | 6/2002 | Thomas | |
| 6,421,675 B1 | 7/2002 | Ryan et al. | |
| 6,426,761 B1 | 7/2002 | Kanevsky et al. | |
| 6,457,028 B1 | 9/2002 | Pitkow et al. | |
| 6,466,970 B1 | 10/2002 | Lee et al. | |
| 6,480,837 B1 | 11/2002 | Dutta | |
| 6,490,577 B1 | 12/2002 | Anwar | |
| 6,505,232 B1 | 1/2003 | Mighdoll et al. | |
| 6,546,388 B1 | 4/2003 | Edlund et al. | |
| 6,571,239 B1 | 5/2003 | Cole et al. | |
| 6,631,372 B1 | 10/2003 | Graham | |
| 6,638,314 B1 | 10/2003 | Meyerzon et al. | |
| 6,654,813 B1 | 11/2003 | Black et al. | |
| 6,671,711 B1 | 12/2003 | Pirolli et al. | |
| 6,754,873 B1 | 6/2004 | Law et al. | |
| 6,763,362 B2 | 7/2004 | McKeeth | |
| 6,789,076 B1 | 9/2004 | Dutta | |
| 6,832,218 B1 | 12/2004 | Emens et al. | |
| 6,856,967 B1 | 2/2005 | Woolston et al. | |
| 6,873,982 B1 | 3/2005 | Bates et al. | |
| 6,901,553 B1 | 5/2005 | Hayashi et al. | |
| 6,944,609 B2 | 9/2005 | Witbrock | |

(Continued)

OTHER PUBLICATIONS

Collaboratively Searching the Web—An Initial Study. By Agustin Schapira. Pub. 1999.

(Continued)

*Primary Examiner* — Michael Hicks
(74) *Attorney, Agent, or Firm* — Gazdzinski & Associates, PC

(57) ABSTRACT

A method and a system for maintaining the freshness of a search engine server's database. A popularity parameter is defined, and a popularity value is assigned to each link in the search engine's database. The most popular links are selected for updating the contents stored, or associated with, the site to which the links refer. In one embodiment, popularity is based at least in part on the search results generated by the search engine in response to user queries.

27 Claims, 5 Drawing Sheets

U.S. PATENT DOCUMENTS

| | | |
|---|---|---|
| 6,963,867 B2 | 11/2005 | Ford et al. |
| 7,076,483 B2 | 7/2006 | Preda et al. |
| 7,398,271 B1 | 7/2008 | Borkovsky et al. |
| 2001/0044791 A1 | 11/2001 | Richter et al. |
| 2002/0021665 A1 | 2/2002 | Bhagavath et al. |
| 2002/0059221 A1 | 5/2002 | Whitehead et al. |
| 2002/0062223 A1 | 5/2002 | Waugh |
| 2002/0062323 A1 | 5/2002 | Takatori et al. |
| 2002/0099602 A1 | 7/2002 | Moskowitz et al. |
| 2002/0111847 A1 | 8/2002 | Smith |
| 2002/0123988 A1 | 9/2002 | Dean et al. |
| 2002/0143759 A1 | 10/2002 | Yu |
| 2002/0156917 A1 | 10/2002 | Nye |
| 2003/0046311 A1 | 3/2003 | Baidya et al. |
| 2003/0050927 A1 | 3/2003 | Hussam |
| 2003/0172075 A1 | 9/2003 | Reisman |
| 2004/0117654 A1 | 6/2004 | Feldman et al. |
| 2006/0004594 A1 | 1/2006 | Doliov |
| 2006/0253434 A1 | 11/2006 | Beriker et al. |

OTHER PUBLICATIONS

Digging for Gold on the Web: Experience with the WebGather. Jiangou Liu, Ming Lei et al. IEEE 2000.

Distribution of surfers' paths through the World Wide Web: Empirical characterizations. WWW 1999. Peter L. T. Pirolli and James E. Pitkow.

Dynamic Management of URL Based on Object-Oriented Paradigm. By Gun-Woo Nam et al. Proceedings of the 1998 International Conference on Parallel and Distributed Systems.

E.G. Coffman, Jr. et al. Optimal Robot Scheduling for Web Search Engines. Journal of scheduling. Pub. 1997.

Fangyan Du. A Web Meta-Search Engine Using a Ranking Algorithm Based on a Markov Model. Master Thesis. May 12, 2001.

J. Cho & Garcia-Molina, The Evolution of the Web and Implications for an Incremental Crawler, Proceedings of the Twenty-sixth International Conference. Sep. 2000.

Jenny Edwards et al., An Adaptive Model for Optimizing Performance of an Incremental Web Crawler, WWW10, May 1-5, 2001.

Jiangou Liu et al., Digging for Gold on the Web: experience with the WebGather, IEEE 2000.

Junghoo Cho and Hector Garcia-Molina, Synchronizing a database to Improve Freshness, ACM Jun. 2000.

SearchPad: explicit capture of search context to support Web search. Krishna Bharat. Computer Networks. Publication 2000.

Vijay Gupta and Roy Campbell, Internet Search Engine Freshness by Web Server Help. Symposium meeting dates Jan. 8, 2001-Jan. 12, 2001. IEEE 2001.

Vol. 16 No. 5. Sep. 2001. J. Comput. Sci. & Technol. Improved Relevance Ranking in WebGather. Lei Ming et al. pp. 410-417.

World Wide Web Navigation Aid. Miena Head et al. Journal Article Published 2000.

Zahir Tari et al. A CORBA Cooperative Cache Approach with Popularity Admission and Routing Mechanism. Australian Computer Society. Copyright 2001.

METHOD AND SYSTEM FOR UPDATING A SEARCH ENGINE

BACKGROUND OF THE INVENTION

1. Field of the Invention

The invention generally relates to systems and methods for updating a search engine in a computer network, such as the Internet. More particularly the invention is directed to a system and method for improving the freshness of links identified by the search engine in response to a search query.

2. Description of the Related Art

Computer networks have become convenient and popular means for the exchange of information. An example of such computer networks is, of course, the Internet. The Internet is a vast, decentralized public computer network that allows communication between millions of computers around the world. The large volume of information on the Internet, however, creates daunting challenges for those desiring to identify and locate specific information.

For example, a part of the Internet known as the World Wide Web ("the Web") consists of millions of computers that store electronic files that may be accessed via the Internet. The computers and electronic files are respectively known as "web sites" and "web pages." Web pages are created to present all kinds of information, from commercial catalogs and advertisements, to scientific literature, to governmental regulations, etc. It has been reported that there are already more than a billion web pages, and the Web is expected to grow to 100 billion web pages within two years. Without the appropriate tools, finding specific information stored somewhere in the billions of web pages amounts to the proverbial task of finding a needle in a haystack.

A search engine is one of those tools that facilitates locating the desired information in a network such as the Web. A user usually accesses a web site that hosts a "search engine" and submits one or more search queries related to the information sought. Generally, a search engine is a computer program that, when queried for information, retrieves either related information or pointers to the location of related information, or both, by evaluating its database. In the Web context, when a user submits a query, the search engine usually responds with a list of links pointing to information resources, typically web pages hosted on other web sites, that are derived from matching entries in the search engine's database. As used herein, the term "link" is generally any representation or symbol (e.g., an address) that points to the location of an information resource, such as a web page. For example, typically a link on the Web is a pointer found in one file which references another file. The link on the Web commonly refers to a Uniform Resource Locator (URL), the global address of documents and other resources on the Web.

However, because web pages, or the URLs pointing to them, may be modified at random times by their maintainers ("web masters"), often the search engine responds to the user's request with URLs from its database that are outdated. When a webmaster changes the content of a web page, including adding or removing content or deleting the page altogether, a search engine database does not immediately reflect these changes. A typical search produces a large number of links that either point to a web site that does not exist, or to a web page that has been modified, moved or deleted. Consequently, when a user clicks on the outdated URL provided by a search engine, an error results and the user is unable to access the intended content. For this reason, search engines strive to keep track of the ever changing Web by continuously finding, indexing, and re-indexing web pages. As used here, "indexing" means the storing of links pointing to information resources, as well as some—or all—of the data associated with the information resource.

Most, although not all, search engines utilize computer applications called "spiders" or "robots" to index the myriad of web sites on the Internet and gather content information for their search engine's databases. The term "content information" as used here means either a URL or the data on the web page associated with the URL, or both. Inherently, a search engine robot indexes a significant number of all the information resources (e.g., web pages) in the Internet. For example, it has been reported that the search engines maintained by Inktomi Corporation and Google Inc. index nearly 500 and 200 million web pages, respectively.

Usually a robot updates the links in the search engine's database in a sequential manner, i.e., starting at the first link and continuing to the last, then starting over again. The cycle time of most search engine robots, that is the time between sampling the same web site and incorporating any changes into the search engine's database can be a significant period of time—as long as several months. Moreover, if a particular site is not accessible when a robot comes around to examine it, the robot will not index the web pages on that web site until some future time. In the worst case scenario, the URL pointing to the web site (including any URLs to any of its web pages) could be excluded from the search engine's database entirely. As more web sites come online, the amount of time for a search engine's robot operation to cover the entire Internet continues to increase, requiring additional computing resources.

It is clear that the time-delay between indexing and reindexing any one content resource, e.g., a web page, leads to information stored in the search engine's database that is stale, e.g., outdated or not "fresh" URLs. Currently, over a given time period, an equal amount of computing resources are dedicated to refreshing each link stored in the search engine's database. However, given the large number of dynamically changing Internet resources to monitor, and only limited resources (bandwidth and storage) available to do the monitoring, there is a need in the relevant technology for a system and a method of deciding which resources should be updated first and when.

SUMMARY OF THE INVENTION

The invention disclosed here seeks to overcome the problem of stale information in a search engine's database by providing a system and method of improving the freshness of the contents of the database. In one embodiment, the invention provides a method of updating contents of a search engine database comprising a plurality of links each associated with a resource. The method may comprise determining popularity of each of the plurality of links based, at least in part, on the frequency of retrieval of the link by the search engine in response to a search request. The method may further comprise determining whether the popularity of the link exceeds a predetermined popularity threshold, the method may further include updating information associated with the link, provided that the popularity exceeds the popularity threshold.

In another embodiment, the invention provides a system for updating contents of a search engine database comprising a plurality of links each associated with a resource. The system may comprise a first module that is configured to determine the popularity of each of the plurality of links based, at least in part, on the frequency of retrieval of said link by a search engine in response to a search request; the first module may further determine whether the popularity of the link exceeds a predetermined popularity threshold. The system may further comprise a second module, operationally connected to the first module, that is configured to access the search engine database and the resource for updating information associated with the link, provided that the popularity exceeds the popularity threshold.

Another aspect of the invention is a system for updating contents of a search engine database comprising a plurality of links each associated with a resource. The system of this embodiment may comprise means for determining popularity of each of the plurality of links based, at least in part, on the frequency of retrieval of said link by the search engine in response to a search request. The system may further comprise means for determining whether the popularity of the link exceeds a predetermined popularity threshold. The system may further includes means for updating information associated with the link, wherein updating information is performed if the popularity exceeds the popularity threshold.

In another embodiment, the invention provides a method of updating contents of a search engine database comprising a plurality of links each associated with a resource. The method of this embodiment may comprise determining popularity of each of the plurality of links based, at least in part, on the frequency of retrieval of said link by the search engine in response to a search request. The method may further comprise updating information associated with at least one of the plurality of links, wherein the most popular link among not-yet-updated links of the plurality of links is selected first for updating.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

Figure 1:
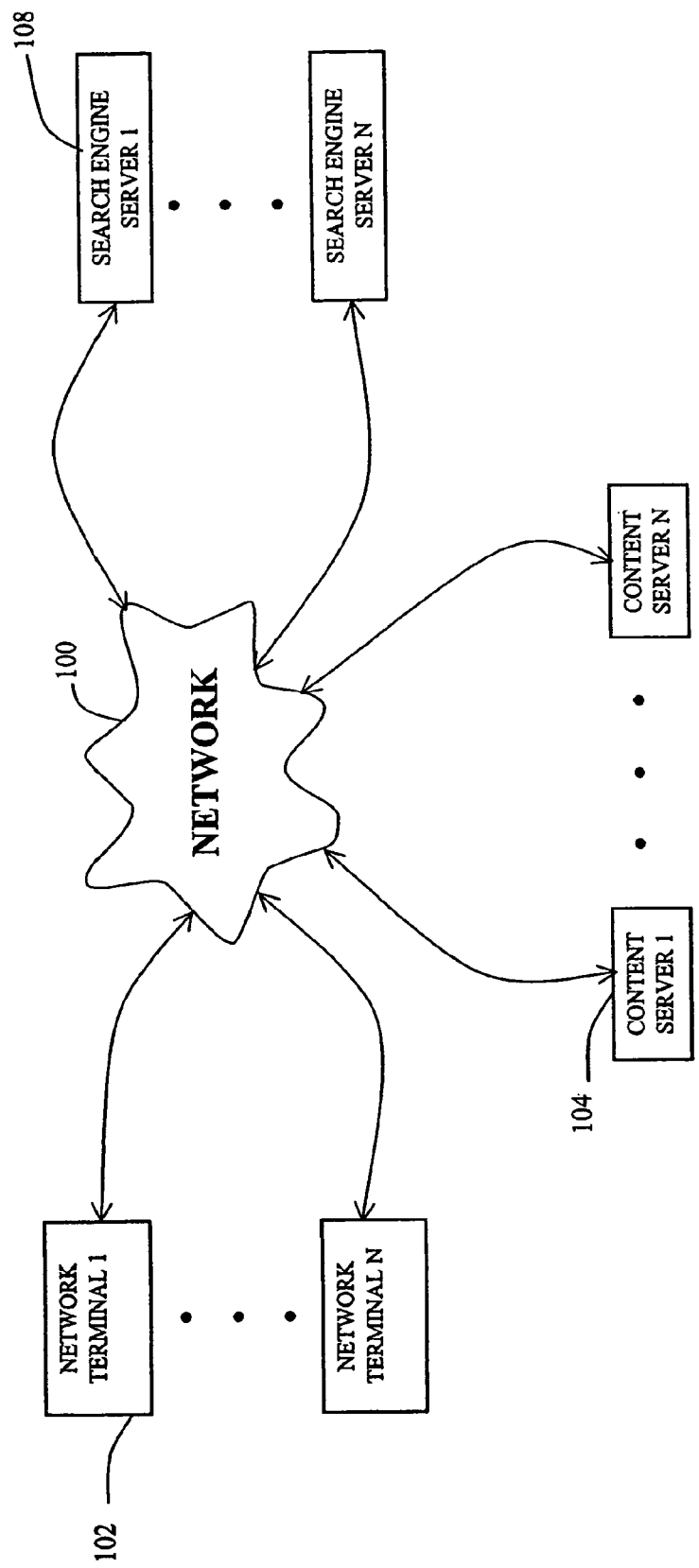
FIG. 1 is a block diagram showing a typical computer network that utilizes one or more search engine servers.

The following detailed description is directed to certain specific embodiments of the invention. However, the invention can be embodied in a multitude of different ways as defined and covered by the claims. In this description, reference is made to the drawings wherein like parts are designated with like numerals throughout. FIG. 1 is a block diagram showing a typical computer network that utilizes one or more search engine servers. Typically, the network 100 provides communications among at least one network terminal 102, at least one search engine server 108, and/or at least one content server 104. As illustrated, the search engine server 108 and the content server 104 may also establish bidirectional communication via the computer network 100. The network terminal 102, search engine server 108, and content server 104 communicate via the computer network 100 in a manner that is well known in the pertinent technology, such as in accordance with the TCP/IP communication standard used over the Internet.

The computer network 100 may be any distributed computer network such as, for example, a local area network (LAN), a wide area network (WAN), or other connection services and network variations such as the Internet, the World Wide Web, a private computer network or intranet, a value-added network, and the like. The network terminal 102 may be any processor-based device configured to access the computer network 100, including terminal devices, such as personal computers, workstations, servers, mini-computers, main-frame computers, laptop computers, mobile computers, palm top computers, hand held computers, set top boxes for a TV, or a combination thereof. The network terminal 102 may further include input devices such as a keyboard or a mouse, and output devices such as a computer screen or a speaker.

Figure 2:
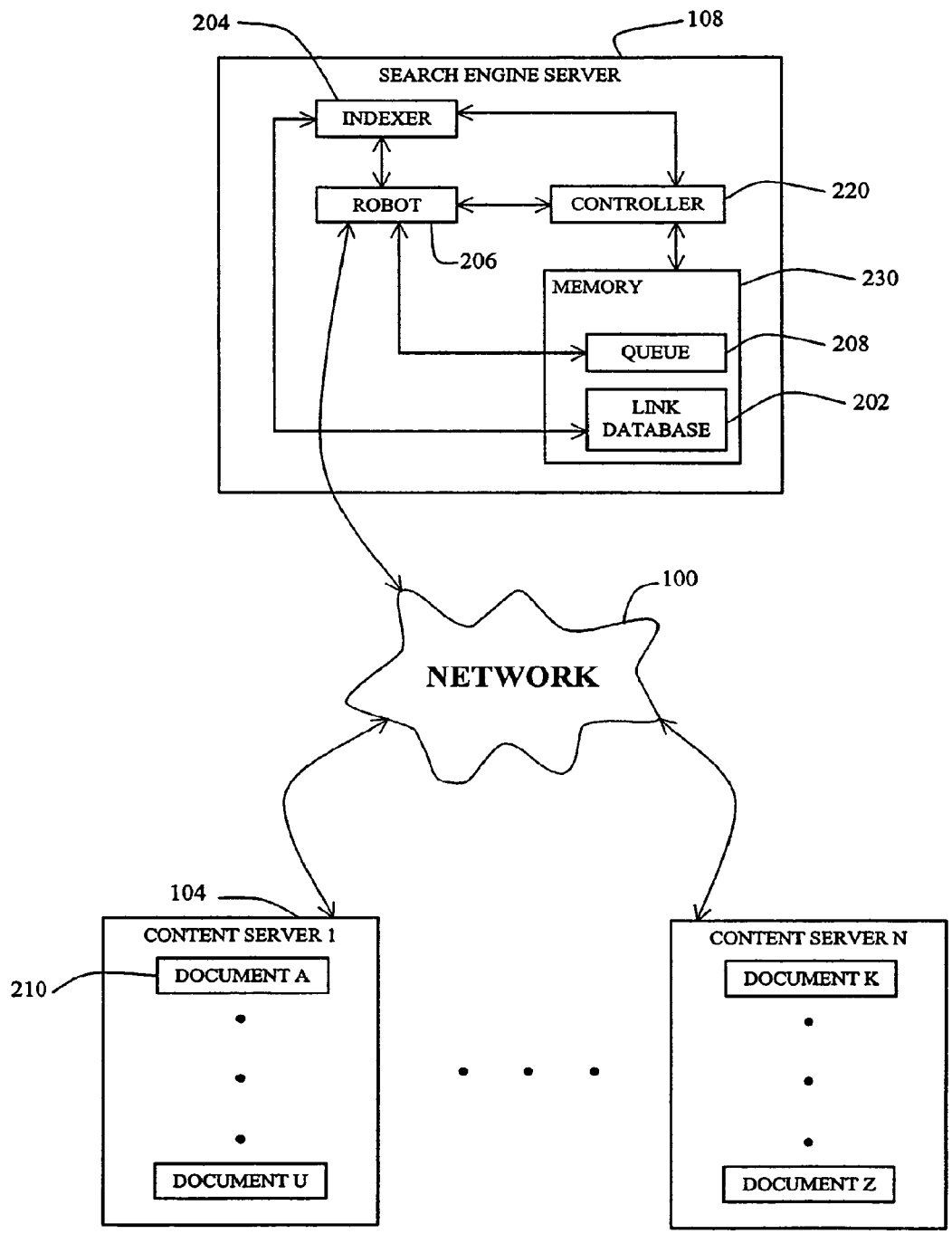
FIG. 2 is a block diagram that illustrates the interaction between the search engine server and the content server of FIG. 1.

The search engine server 108 is typically a processor-based device that is programmed with instructions to receive search queries and process them using algorithms that compare terms of the search query with the data associated with each link stored in a database (see FIG. 2 and accompanying discussion for further details). The content server 104 is usually also a processor-based device similar to the search engine server 108; however, the content server 104 is configured to store data and to forward some, or all, of that data in response to requests made by, for example, the network terminal 102 and/or the search engine server 108. The data stored in the content server 104 is typically in the form of a electronic files (e.g., web pages built with Hypertext Markup Language or HTML) accessible over the computer network 100. In one common scenario, the location of each web page stored in a web site is associated with a unique URL.

It will now be explained how the network 100 provides specific information sought by a user. Typically a user seeks to access specific data stored in one or several content server 104. However, often the situation arises where the user does not know which content server 104, or even where within a specific content server 104, the data resides. To identify the location of the desired data, the user will usually request a search engine server 108 to identify a set of links that are relevant to the user's desired information. To accomplish this, the user utilizes a network terminal 102 to establish a communication session with a search engine server 108 via the network 100. Having established this communication session, the user then inputs a query into the network terminal 102, which transmits the query to the search engine server 108. The search engine server 108 processes the query according to any one of a number of well-known algorithms and transmits to the user a list of links pointing to information resources, e.g., document 210 (see FIG. 2), that may be relevant to the user's query. The links are usually retrieved from a database stored in, or at least accessible to, the search engine server 108. From the list provided by the search engine server 108, the user then selects at least one link that appears pertinent to the information she desires. When the user selects the link, the network terminal 102 makes a request to the content server 104 associated with the selected link to transmit the document 210 stored in the content server 104, and to which the link refers, to the network terminal 102. In brief, the user employs the network terminal 102 to access the search engine server 108 in order to obtain a list of links that point to the documents 210 stored in the content servers 104. Having obtained these links, the user access the information stored in the document 210 by clicking on the link that points to it.

FIG. 2 is a block diagram that illustrates the interaction via the network 100 between the search engine server 108 and the content server 104. The content server 104 is the same as described with reference to FIG. 1, except that the electronic files it stores are now shown as documents 210. In one embodiment, the search engine server 108 may include a controller 220 in communication with a memory 230, an indexer 204, and a robot 206. The search engine server 108 further comprises a link database 202 in communication with the indexer 204. The link database 202 may conveniently reside in the memory 230, or it may be located in another memory accessible by the search engine server 108. The indexer 204 is in communication with the robot 206. In one embodiment, the robot 206 also communicates with a queue 208 which may reside in the memory 230, for example.

As further described below, the controller 220 is configured to coordinate the functionality of the link database 202, indexer 204, robot 206, and queue 208. The controller 220 may comprise any commercially available processor, such as a Pentium Pro, any processor in the 680x0 family of processors manufactured by Motorola, etc. The memory, conventionally connected to the processor, may be in the form of a cache memory for rapid access to the cached (i.e., stored) information, or other type of memory, such as a dedicated hard disk, or a combination of both.

The link database 202 is configured to store information typically obtained from, for example, the web site or web page associated with a given URL or link. One example of a link stored in the link database 202 is the URL http://www.hostsite.com/index.html. This link represents the global address of the web page "index.html" hosted on a content server 104. The link is associated in the link database 202 with data (e.g., text, images, etc.) stored in the web page "index.html." The link database 202 may be implemented with a standard database management software such as Oracle's database applications.

The robot 206 is a software module that accesses the documents 210, stored in the content servers 104, identified by the links stored either in the database 202 or the queue 208. The Robot 206 gathers the data stored in the documents 210 and forwards it to the indexer 204. Software modules such as robot 206 are well known in the relevant technology. Robot 206 is also known in the relevant technology by the names spider, crawler, wanderer, or gatherer, for example. In one embodiment, the queue 208 contains a list of links, e.g., a subset of the links stored in the link database 202, which the robot 206 uses for updating purposes. The queue 208 may be, for example, a file which is preferably stored in the memory of the search engine server 108.

The indexer 204 receives data (e.g., web pages) retrieved by the robot 206, and extracts some portion of that data that is used to associate a given link with the information on the file to which the link refers. For example, usually the indexer 204 identifies individual words from the text of a file or, in the case of a web page, the indexer 204 retrieves the text stored in the "keywords" or "description" fields of the web page. The indexer 204 then, for each document 210, associates its link with the extracted data and stores them in the link database 202. Indexing programs that perform the functions of indexer 204 are well known in the pertinent technology. An example of an indexer 204 is the Ultraseek Server™ indexer produced by Infoseek Corporation.

In one embodiment, the robot 206 uses the links stored either in the link database 202 or in the queue 208 to access the documents 210 stored in the content servers 104, and optimizes the freshness of the links displayed in response to a user query. The robot 206 then forwards some or all of the data associated with the document 210 to the indexer 204. From this data, the indexer 204 extracts any data it needs for association with the respective link that identifies the document 210. The indexer 204 also stores the associated data and link in the link database 202. In one embodiment, the indexer 204 may compare the data already stored in the link database 202 against the new data gathered by the robot 206. If there are any discrepancies in the data, the indexer stores the appropriate updates in the link database 202. Otherwise, the indexer 204 concludes that the webmaster has not modified the contents, or the link, associated with the document 210. In the latter case, the indexer 204 does not modify the contents of the link database 202. In another embodiment, however, the indexer 204 may simply inspect that the link is still valid. That is, the indexer 204 only verifies that the robot 206 was able to access any data by using the respective link pointing to a given document 210. Thus, in this manner the robot 206, queue 208, and indexer 204 collaborate to refresh the contents of the link database 202.

Figure 3:
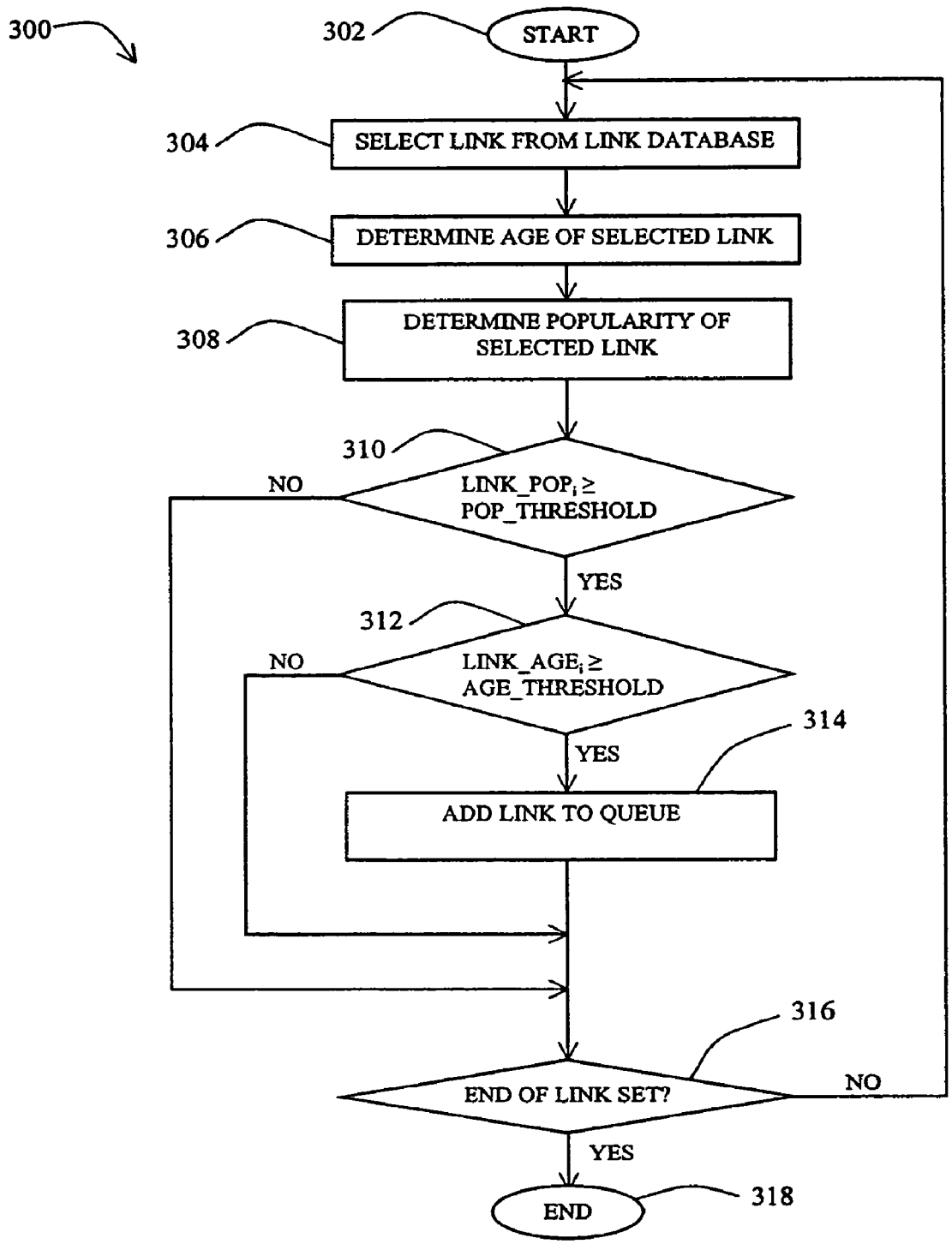
FIG. 3 is a flowchart depicting a process of determining whether and when to update one or more links by the search engine.

FIG. 3 is a flowchart depicting a process 300 of determining whether and when to update one or more links by the search engine server 108 according to one embodiment of the invention. The process 300 is one way of constructing or updating the link list in the queue 208. The process 300 starts at a block 302 where the link database 202 is to be updated at least on a periodic basis. At a block 304, the controller 220 selects a link from the link database 202. In one embodiment, the controller 220 selects the links on the basis of a "popularity" parameter. The popularity parameter is explained in detail in the discussion of block 308 below. Hence, the controller 220 may select a link from a group of links in the link database 202 determined to be the most popular links. For example, the controller 220 may select the 2,000 most popular links to determine which of them will be the 1,000 links to be placed in the queue. This example assumes that the queue 208 has been limited to 1,000 links by design choice. The skilled artisan will recognize that any number of desired links may be chosen for these purposes. In other embodiments, however, the controller 220 may select the link from the link database 202 on a random basis, or in alphabetical order, or based on any other design parameter relevant to the function of the search engine server 108.

The process 300 then proceeds to a block 306 where the controller 220 determines the "age" of the link selected. In one embodiment, the age of the link ("link_age") is simply the difference of time between current time and the last time that the robot 206 updated the contents associated with that link. For example, if the current time is Aug. 24, 2001, 4:00:00 p.m., and the last time that the robot 206 updated the contents associated with the link was Aug. 20, 2001, 3:00:00 p.m., then link_age is 5,700 minutes (95 hours×60 minutes/hour). Of course, it will be apparent to a person of ordinary skill in the art that the choice of units for linkage is a matter of convenience. The parameter link_age may be conveniently stored in the link database 202.

After the controller 220 determines link_age at block 306, the process 300 moves next to a block 308 where the controller 220 determines the "popularity" of the link ("link_pop"). The parameter link_pop may be conveniently stored in the link database 202. The controller 220 may determine link_pop in a number of ways. In one embodiment, for example, link_pop may be the number of times users have accessed the information resource, i.e., document 210, associated with a given link. In the Web context, for example, the use of a redirector counts ("visit counter") number of visits to a selected link by linking to a counter on the search engine server 108. A redirection allows the search engine to count how many times visitors visit a site. These visit counters are commonly used, for example, on software download sites that link to external downloads so the site can track the most popular downloaded software. Additionally, also in the web context, webmasters maintain a counter that keeps track of the number of time users visit a website. In one embodiment, such a counter may be used for the present purposes if it is accessible to the search engine. Thus, during the process 400 described below, the robot 206 may retrieve the value of the visit counter, and the indexer 204 may associate such a value with the resource link. In this example, to determine link_pop, the controller 220 simply assigns the value of the visit counter to link_pop.

In another embodiment, link_pop may be the number of times that a link is selected by the search engine server 108 as a search result in response to user queries. In this embodiment, whenever a user submits a query to the search engine server 108, the search engine server 108 selects a group of links that are relevant to the user's query. Typically the links in such a group are ordered according to a measure of "relevance" determined by an algorithm executing on controller 220. In addition to displaying the selected group of links to the user (see FIG. 5), the search engine server 108 also increases the value of an "appearance" counter associated with each link in the link database 202. The appearance counter reflects the number of times the search engine server 108 selects a link in response to user queries. Hence, the controller 220 may assign the value of the appearance counter to link_pop.

In yet another embodiment, link_pop may be the value of an "access" counter associated with the number of times that users access the document 210 associated with a given link after the search engine server 108 selects that link as a search result in response to user queries. In this embodiment, then, link_pop depends not only on its "appearance" as a search result, but rather link_pop is also based on whether or not the user actually chooses the link as one worthy of further investigation. In this example, every time that a user, having submitted a query to the search engine server 108, actually selects a link from the list provided by the search engine server 108, the link_pop value associated with that link would be increased. In a variation of this embodiment, the value of link_pop may be based on a functional relationship with respect to a period of time. Thus, for example, link_pop may be the number of times that users choose the link, after appearing as a result to a query, over a predefined period of time. The predefined period of time may be, for example, the last 365 days, last 30 days, last 7 days, year-to-date, month-to-date, or week-to-date. In such an embodiment it would be possible to take into account the "freshness" of the popularity score by, for example, screening out links that have a high "access" counter number but which "access" counter number achieved a maximum in a period of time which is no longer recent or relevant.

In another variation the link_pop value may be given a higher value if it is the last link that a user selects when performing a specific search. For example, if a user clicks on a link retrieved by the search engine server 108 as a result of a search and subsequently returns to the same search results to select a different link (which is determined via a redirector) then the link first selected is presumed to not be associated with the data the user is seeking. However, if the user selects a link and does not return to the results retrieved by the search engine server 108, the link_pop value for that link would be accorded a higher value. This presumes that the user has found the data he is seeking.

In one embodiment, the search engine server 108 may be configured to provide a "revise search" and "new search" functions. The revise search function indicates that the user has selected links that do not retrieve data the user is seeking; hence, the user is able to revise the search query. In this case the search engine server would not increase the link_pop value associated with the lask link selected—if any link is selected from the results retrieved—since the link did not provide to the user the data the user is seeking. The "new search" function indicates that the user has found the data he is seeking and is now looking for different data. By keeping track of the selection of links, whether it occurs in a "revise search" or "new search," the links associated with the data that satisfies the user's search may be given higher link_pop values.

Once the controller 220 determines link_pop, the process 300 proceeds to a decision block 310 where the controller 220 determines whether link_pop is greater or equal to a predetermined popularity threshold ("pop_threshold"). In one embodiment, pop_threshold may be an absolute number reflecting any design choice for the degree of link_pop. For example, using the measure of link_pop just previously discussed above, by design choice it may be determined that a popular link requiring update priority is any link which, after appearing as a relevant link in response to user queries, has been actually selected at least 100, 1,000 or 10,000 times in the last month. Hence, pop_threshold would be 100, 1,000 or 10,000 (actual selections in the last 30 days). The parameter pop_threshold may be conveniently stored in the link database 202, or somewhere else in the memory 230. If at decision block 310 the controller 220 determines that link_pop exceeds or is equal to pop_threshold, the process 300 continues onto block 312; however, if link_pop does not exceed pop_threshold then the process 300 moves to a decision block 316.

At decision block 312, the controller 220 determines whether link_age is greater or equal to an age threshold ("age_threshold"). As discussed above, link_age is the period of time between the current time and the time at which the robot 206 last updated the contents associated with the selected link. The parameter age_threshold may be conveniently stored in the link database 202, or somewhere else in the memory 230. Having determined that the link is popular, since it equals or surpasses pop_threshold, the controller 220 now determines if the link is old enough that it requires updating. In one embodiment, for example, age_threshold is chosen such that the controller 220 places a popular link in the queue 208 if its associated link_age is greater or equal to an age_threshold of 1440 minutes (i.e., one day). That is, at block 314, the controller 220 places in the queue 208 any popular link that the robot 206 has not updated within the last day. If, however, link_age does not exceed or equal age_threshold, then it is considered that the contents associated with the link are "fresh," and consequently, the controller 220 does not place the link in the queue 208 for updating. In such a case, the process 300 then moves to block 316.

At decision block 316, the controller 220 determines whether there are any remaining links in the link database 202 that need to be examined for copying into the queue 208. If so, the process 300 returns to block 304 where the controller 220 selects one of the remaining links, and the process described above begins again. Otherwise, the process 300 ends at a block 318.

It should be apparent to a person of ordinary skill in the relevant technology that the process 300 need not be performed in the same sequence as described above. More specifically, the functions of blocks 304 and 306 may be interchanged such that the controller 220 determines link_pop before determining link_age. Similarly, it need not be the case that decision block 312, where it is determined whether link_age is greater or equal to age_threshold, always follows decision block 310. For example, by moving decision block 312 before decision block 310, it is possible to screen out from the queue 208 a fresh link (i.e., one updated recently) regardless of the link's popularity.

Moreover, it will be readily recognized by the skilled artisan that the process 300 of building or updating the queue 208 may be accomplished in other ways that generate the same result, namely producing or updating queue 208—for updating content associated with the links stored in the link database 202—where the decision as to which links to place in the queue 208 depends at least in part on the popularity of the links. For example, a variation of the process 300 may be carried out by determining an "update rank" for each link in the link database 202. The controller 220 may determine an update rank by, for example, multiplying link_pop by link_age (i.e., update_rank=link_pop×link_age). With this approach those links that are both the least fresh and the most popular would be ranked the highest in the queue 208 for updating purposes. For example if for a link A link_pop is 100 (accesses in the last 30 days) and link_age is 15 days, then update_rank for link A would be 1500. Now, if for a link B link_pop is 50 (accesses in the last 30 days) and link_age is 20 days, then update_rank for link B would be 1000. Hence, link A would have a higher update priority than link B because it has a greater value for update_rank. In this case, the controller 220 would serve link A to the robot 206 for updating before serving it link B. Since the popularity of any one link changes dynamically as millions of users submit tens of millions of queries to the search engine server 108, the queue 208 would be revised dynamically due to the continuously changing update_rank of the links in the link database 202. In this example, the robot 206 would just simply update the highest ranked link on the queue 208. Or, alternatively, the controller 220 may instruct the robot 206 to continuously update all links having a rank above a predetermined rank threshold.

In one embodiment, the search engine server 108 may also be configured with a second robot to visit links based solely on link_age. This ensures that the search engine server visits substantially all links on the link database 202 at some point. Performing this function allows, for example, the removal of links associated with websites that no longer exists on the network 100.

Figure 4:
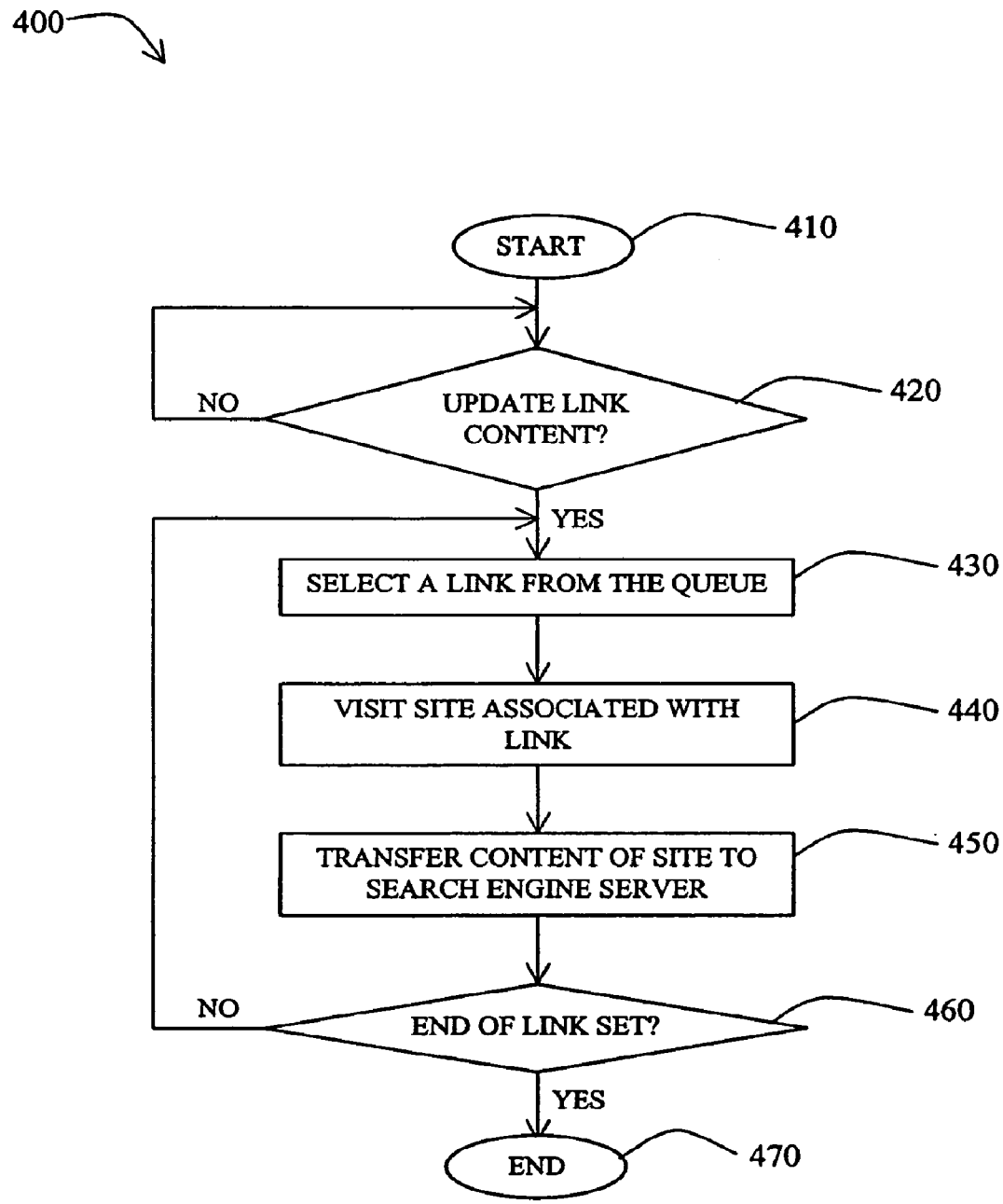
FIG. 4 is a flowchart that depicts a process of updating contents of the search engine database of FIG. 2 in accordance with one embodiment of the invention.

FIG. 4 is a flowchart that depicts a process 400 of updating contents of the link database 202 in accordance with one embodiment of the invention. The process 400 starts at block 410 after the search engine server 108 has built a new, or updated and existing, queue 208 as described above. As noted above, the robot 206 uses the link list in the queue 208 for the purpose of refreshing or updating the link database 202. The process 400 then proceeds to a decision block 420 where it is determined whether the links in the queue 208 should be updated by the robot 206. In one embodiment, the robot 206 may be instructed to update all the links in the queue 208 once every predetermined period of time. For example, the period of time may be twenty-four hours. Hence, if the robot 206 has updated the links in the queue 208 within the last twenty-four hour period, at decision block 420 the controller 220 does not instruct the robot 206 to update the content associated with the links in the queue 208. In such a case, the process 400 may loop back to the decision block 420 until the current twenty-four hour period expires. In another embodiment, however, the controller 220 may instruct the robot 206 to continuously update the links in the queue 208. In such an embodiment, at decision block 420 the controller 220 continually instructs the robot 206 to update the content associated with the links in the queue 208.

If the robot 206 should update the content associated with the links in the queue 208, the process 400 moves to a block 430 where the controller 220 selects a link from the queue 208 to serve to the robot 206. In one embodiment, the controller 220 arranges the links in the queue 208 according to any desired design criterion (e.g., randomly, alphabetically, etc.). In this embodiment, the robot 206 selects a link in order of appearance in the queue 208. After the controller 220 selects a link from the queue 208 and serves it to the robot 206, the process 400 proceeds to a block 440.

At block 440, the robot 206 "visits" the site identified by the selected link; that is, the robot 206 forwards a request to the content server 104 for the data contained, usually, in a "main page" hosted by the content server 104. At this point, in the Web context for example, typically the robot 206 reads the text of the of the web page in the same manner that a web browser does, and the robot 206 at block 450 forwards the data to the indexer 204 for further processing. There are different approaches known in the relevant technology as to how the robot 206 "crawls" inside a content server 104, or between several content servers 104. For example, in one embodiment the robot 206 may retrieve the information contained in all the sites linked to the starting point (i.e., the starting link) before following links further away from the start. In another embodiment, the robot 206 follows all the links from the first link on the starting page, then the first link on the second page, and so on. Once the robot 206 transfers the relevant information associated with the first link on each page, the robot 206 proceeds to the second and subsequent links, and so on.

The process 400 now moves to a decision block 460 where the controller 220 determines whether there are any remaining links in the queue 208 that must be updated. If the robot 206 has not updated all the links in the queue 208, the process returns to block 430 where the robot 206 updates the next link. However, if at decision block 460 the controller 220 determines that the robot 206 has updated all the links in the queue 208, the process 400 ends at block 470.

Figure 5:
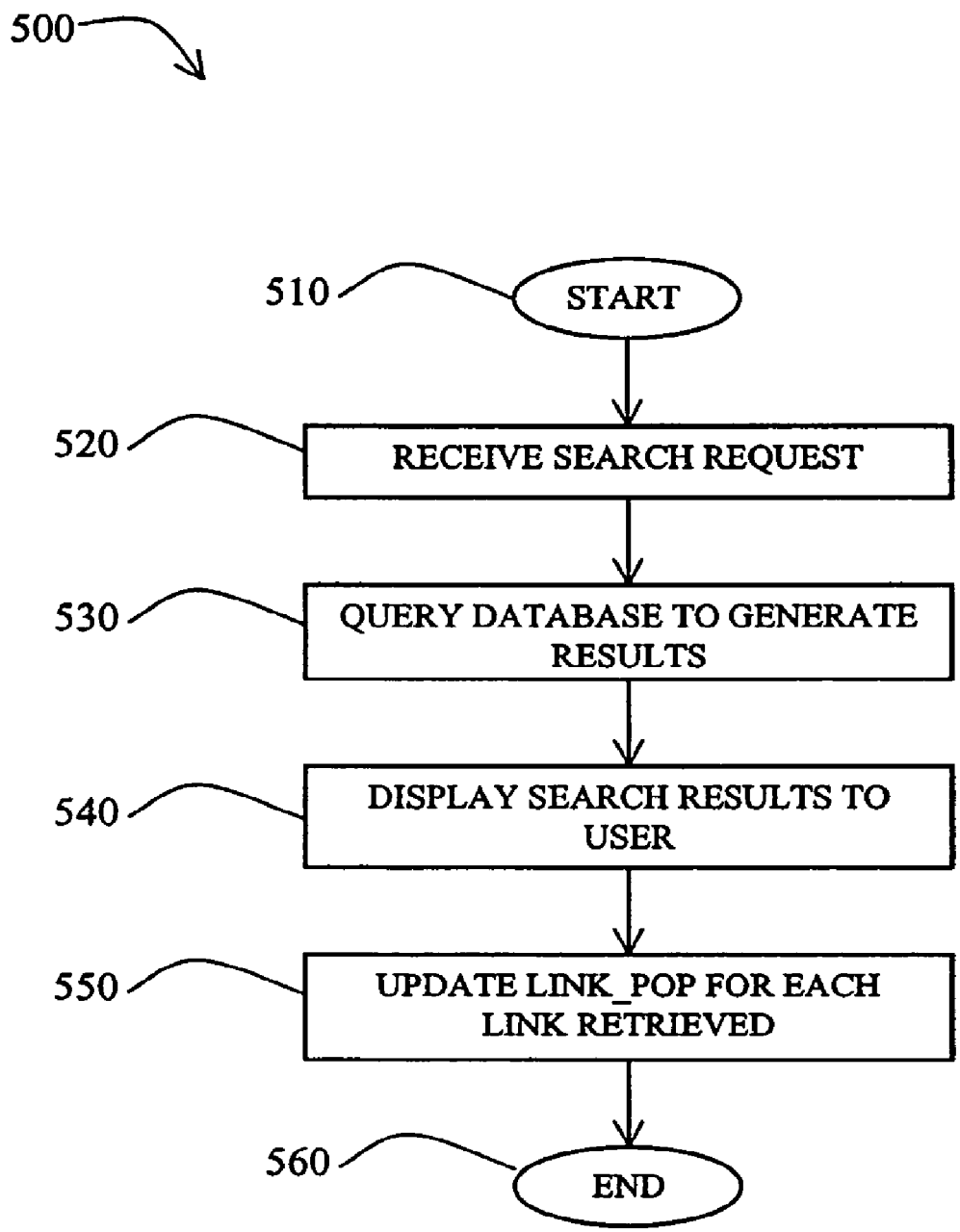
FIG. 5 is a flowchart illustrating a process of obtaining user input for determining the popularity of a link.

FIG. 5 is a flowchart illustrating an exemplary process 500 of obtaining user input for use in determining the popularity of a link. The process 500 starts at a block 510 where a user inputs a query into the network terminal 102, after having established a communication session between the network terminal 102 and the search engine 108 via the network 100. At block 520 the search engine server 108 receives the search request from the user. Such search queries are well known in the relevant technology. A query may be, for example, a string of words associated through designated "connectors," and may look like this: rabbit & breeder ~volkswagen. The connectors being "&" (meaning "and") and "~" (meaning "but not"), this query instructs that the user desires to retrieve links pointing to sites having the terms "rabbits" and "breeders" but not having the term "volkswagen." This type of query is also known as a boolean search. Another query may include only a single term (e.g., "patents"), or simply a link such as <www-.micron.com>. In the latter case, the query means that the user wants information related to the information resource identified by the link <www.micron.com>.

After the search engine server 108 receives a search request at block 520, at block 530 the controller 220 queries the link database 202 in order to generate a list of "relevant" links, which is called the "search results." Algorithms for selecting relevant links in response to a search request are well known in the art. After applying the proper algorithm to the contents of the link database 202, the controller 220 generates the search results. At a block 540, the search engine 108 forwards the search results to the network terminal 102 for display to the user. As previously discussed, the user may select any one of the links provided in the search results in order to access a document stored in a content server 104. The process 500 continues at a block 550 where the controller 220 uses the search results to update the popularity of the links in the link database 202. As discussed in connection with block 308 of FIG. 3, the controller 220 may adjust the value of link_pop associated with each link that the search engine server 108 selects as a search result, or alternatively, the controller 220 may adjust the value of link_pop only for those links that the user actually accesses from the search results. In either case, the controller 220 uses input from the user to determine the popularity of the links in the link database 202. Having adjusted link_pop for the links of the search results, the process then ends at a block 560.

Although the invention has been described in terms of certain preferred embodiments, it may be embodied in other specific forms without departing from its spirit or essential characteristics. The embodiments described are to be considered in all respects only illustrative and not restrictive and the scope of the invention is, therefore, indicated by the appended claims rather than by the foregoing description. All changes which come within the meaning of equivalency of the claims are to be embraced within their scope.

What is claim is:

1. A method of updating with a search engine database, the method comprising:
   determining with one or more computer processors, a popularity score for one or more of the links displayed in association with a first search wherein determining the popularity score of the link comprises:
   tracking whether the user revises the first search query to perform a revised search query for new links; and
   increasing the popularity score of the last link selected by the user from the first search results when the user does not perform a revised search query;
   generating an update rank for the link based at least in part on the popularity score of the link and the age of the link;
   adding the link to a link queue based at least in part on the update rank of the link; and
   updating in the search engine database information associated with the link in the link queue.

2. The method of claim 1, further comprising determining a number of times, during a period of time that one of the links is actually accessed.

3. The method of claim 1, further comprising determining whether the popularity score of the link exceeds a threshold and wherein the update rank is produced as a function of whether or not the popularity score exceeds the threshold.

4. The method of claim 1, further comprising determining whether the information associated with the link has changed and wherein the search engine database is updated when the information associated with the link has changed.

5. The method of claim 1, wherein determining the age of the link comprises determining a time difference between a time the link was last updated and a time at which the link is being considered for updating.

6. The method of claim 1, further comprising determining whether the age of the link exceeds an age threshold.

7. The method of claim 6, wherein updating the information in the search engine database is performed when the age of the link exceeds the age threshold.

8. The method of claim 1, decreasing the popularity score for a selected link when a user selects another link from the first search results.

9. The method of claim 1, decreasing the popularity score for a selected link when the user performs the revised search query for new links.

10. A computer system for updating a search engine database, the computer system comprising:
    a first module executing in one or more computer processors that is configured to select a link from a link database and configured to determine an update rank of the link, wherein the update rank of the link is based at least in part on a popularity score associated with the link and based at least in part on an age of the link;
    wherein determining the popularity of the link comprises one or more computer processors configured to:
    track whether a user revises a first search query to perform a revised search query for new links; and
    increase the popularity score of the last link selected by the user from the first search results when the user does not perform a revised search query;
    a second module executing in one or more computer processors, the second module configured to select a link based at least in part on the update rank of the link, wherein the second module is further configured to update a search engine database with information associated with the selected link.

11. The computer system of claim 10, wherein the first module is further configured to determine a number of times, during a period of time that one of the links is actually accessed.

12. The computer system of claim 10, wherein the first module is further configured to determine whether the popularity score of the link exceeds a threshold and wherein the update rank is produced as a function of whether or not the popularity score exceeds the threshold.

13. The computer system of claim 10, wherein the first module is further configured to determine whether the information associated with the link has changed and wherein the search engine database is updated when the information associated with the link has changed.

14. The computer system of claim 10, wherein the first module is further configured to determine the age of the link by determining a time difference between a time the link was last updated and a time at which the link is being considered for updating.

15. The computer system of claim 10, wherein the first module is further configured to determine whether the age of the link exceeds an age threshold.

16. The computer system of claim 15, wherein the second module is configured to update the information in the search engine database when the age of the link exceeds the age threshold.

17. The computer system of claim 10, wherein the first module is further configured to decrease the popularity score for a selected link when a user selects another link from the first search results.

18. The computer system of claim 10, wherein the first module is further configured to decrease the popularity score for a selected link when the user performs the revised search query for new links.

19. A computer readable apparatus, comprising a storage medium configured to store at least one computer program, the at least one program comprising instructions which are configured to, when executed by a processing device:
    determine a popularity for a link displayed in association with a first search by (i) determining whether the user performs a revised search for one or more new links; and (ii) when the user does not perform the revised search, increase the popularity of the last link selected by the user from results of the first search;

generate an update rank for the link based at least in part on the popularity and age of the link;

add the link to a link queue based at least in part on the update rank of the link; and update in a database information associated with the link.

20. The apparatus of claim 19, wherein the instructions are further configured to determine a number of times, during a period of time, that the link is actually accessed.

21. The apparatus of claim 19, wherein:

the instructions are further configured to determine whether the popularity of the link exceeds a threshold; and the update rank is produced as a function of whether or not the popularity exceeds the threshold.

22. The apparatus of claim 19, wherein:

the instructions are further configured to determine whether the information associated with the link has changed; and the database is updated when the information associated with the link has changed.

23. The apparatus of claim 19, wherein determining the age of the link comprises determining a time difference between a time the link was last updated and a time at which the link is being considered for updating.

24. The apparatus of claim 19, wherein the instructions are further configured to determine whether the age of the link exceeds an age threshold.

25. The apparatus of claim 24, wherein update of the information in the database is performed when the age of the link exceeds the age threshold.

26. The apparatus of claim 19, wherein the instructions are further configured to decrease the popularity for a selected link when a user selects another link from the first search results.

27. The apparatus of claim 19, wherein the instructions are further configured to decrease the popularity score for a selected link when the user performs the revised search query for new links.

* * * * *